(12) United States Patent
Haraguchi et al.

(10) Patent No.: US 7,181,735 B1
(45) Date of Patent: Feb. 20, 2007

(54) METHOD AND APPARATUS FOR ANALYZING PROGRAM BASED ON RULES OF PROGRAMMING LANGUAGE BEFORE OPTIMIZATION IN COMPILER

(75) Inventors: Masatoshi Haraguchi, Kawasaki (JP); Masakazu Hayashi, Kawasaki (JP); Yuji Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 09/616,799

(22) Filed: Jul. 14, 2000

(30) Foreign Application Priority Data

Oct. 27, 1999 (JP) ................................. 11-305026

(51) Int. Cl.
*G06F 9/45* (2006.01)

(52) U.S. Cl. ...................... 717/151; 717/146; 717/154; 717/159

(58) Field of Classification Search ........ 717/136–161, 717/106–109; 716/7
See application file for complete search history.

(56) References Cited

U.S. PATENT DOCUMENTS

| 4,667,290 | A | * | 5/1987 | Goss et al. ................. 717/147 |
| 5,293,631 | A | * | 3/1994 | Rau et al. .................... 717/154 |
| 5,396,631 | A | * | 3/1995 | Hayashi et al. ............. 717/159 |
| 5,548,761 | A | * | 8/1996 | Balasundaram et al. .... 717/159 |
| 5,586,330 | A | * | 12/1996 | Knudsen et al. ............ 717/136 |
| 5,758,164 | A | * | 5/1998 | Inoue ......................... 717/158 |
| 5,764,991 | A | * | 6/1998 | Carcerano .................... 717/140 |
| 5,768,595 | A | * | 6/1998 | Gillies ........................ 717/145 |
| 5,819,097 | A | * | 10/1998 | Brooks et al. .............. 717/141 |
| 5,838,980 | A | * | 11/1998 | Guillen et al. .............. 717/143 |
| 5,872,859 | A | * | 2/1999 | Gur et al. .................... 382/128 |
| 6,175,948 | B1 | * | 1/2001 | Miller et al. ................... 716/7 |
| 6,223,337 | B1 | * | 4/2001 | Blume ........................ 717/126 |

FOREIGN PATENT DOCUMENTS

| JP | 3077142 | 2/1991 |
| JP | 9062514 | 7/1997 |

OTHER PUBLICATIONS

Aho, Alfred, Setho, Ravi anf Ullman, Jeffrey, "Compilers: Principles, Techniques, and Tools", Addison Wesley Longman, 1986, pp. 1-13, 344-359, 463, 589.*
Cifuentes, Cristina and Sendall, Shane, "Specifying the Sematics of Machine Instructions", IWPC '98. Proceedings.*

* cited by examiner

*Primary Examiner*—Kakali Chaki
*Assistant Examiner*—William H. Wood
(74) *Attorney, Agent, or Firm*—Greer, Burns & Crain, Ltd.

(57) ABSTRACT

An apparatus for facilitating optimization processing in a compiler includes a language-specific-rule table which stores one or more predetermined rules which are specified for one or more programming languages; an analyzing unit which analyzes a program code which includes one or more instructions, and is described in one of the one or more programming languages, based on the one or more predetermined rules, to obtain an analysis result; and an embedding unit which embeds the analysis result in the program code.

13 Claims, 9 Drawing Sheets

FIG. 2(A)

| LANGUAGE | Fortran77 | Fortran90 | Fortran95 | C | Java | □□ | △△ |
|---|---|---|---|---|---|---|---|
| VECTOR REPRESENTATION OF ARRAYS | × | ○ | ○ | × | × | ○ | × |
| .. | .. | .. | .. | .. | .. | .. | .. |

FIG. 2(B)

| No. | LANGUAGE | Fortran90 | Fortran95 | □□ |
|---|---|---|---|---|
| 1 | The sizes of arrays on the right-hand and left-hand sides of each assignment statement are identical. | ○ | ○ | × |
| 2 | The mask size of an array in a where statement is identical with the size of an array on the right-hand of side of each assignment statement in the where statement. | ○ | ○ | × |
| .. | .. | .. | .. | .. |

EXAMPLE OF SOURCE CODE

```
1 subroutine sub(a,b,k,L,N)
2 integer(kind=4), dimension(1:6) :: a,b
3 integer(kind=4) :: L,N
4 a(2:L) = b(2:5)
5 b(3:N) = a(1:4)
6 do i=1,L
7    k = k + a(i)
8 enddo
9 end subroutine
```

FIG. 3

EMBEDMENT OF ANALYSIS RESULT

```
subroutine sub(a,b,k,L,N)
integer(kind=4), dimension(1:6) :: a,b
integer(kind=4) :: L,N
L=5
a(2:L) = b(2:5)
N=6
b(3:N) = a(1:4)
do i=1,L
   k = k + a(i)
enddo
```

FIG. 4

RESULT OF COMPLETE UNROLLING OF LOOPS

RESULT OF OPTIMIZATION FOR ENHANCING DEGREE OF PARALLELISM

SOURCE CODE INCLUDING SCALAR
REPRESENTATION OF ARRAYS

```
1 subroutine sub(r,q)
2 real r(100),q(100)
3 do i=1,100
4 r(i)=q(i)
5 enddo
6 end subroutine
```

PRIOR ART
FIG. 8(A)

SOURCE CODE INCLUDING VECTOR
REPRESENTATION OF ARRAYS

```
1 subroutine sub(r,q,L)
2 real r(100),q(100)
3 integer L
4 r(1:L)=q(1:100)
5 end subroutine
```

↓  L=5=M-1=N-2(RESULT OF SUBSCRIPT
ANALYSIS OF ARRAYS)

```
do i=1,5 ! OPTIMIZED LOOP
  a(i)=b(i+1)
  b(i+1)=c(i+2)
  c(i+2)=a(i)
enddo
```

PRIOR ART
FIG. 9

METHOD AND APPARATUS FOR ANALYZING PROGRAM BASED ON RULES OF PROGRAMMING LANGUAGE BEFORE OPTIMIZATION IN COMPILER

BACKGROUND OF THE INVENTION

1) Field of the Invention

The present invention relates to a method for facilitating optimization in a compiler. The present invention also relates to a compiler in which provision is made for facilitating the optimization. The present invention further relates to an apparatus for facilitating optimization processing in a compiler.

2) Description of the Related Art

In the usual compilers, syntax analysis and the like of a source code are performed at the front end, and an object code is generated at the back end. In addition, the object code is optimized for enhancing efficiency of execution of the object code. For example, when the program includes an array description, the array may be recognized as a loop. Since loop operations occupy a considerable time in the execution of the object code, array portions of the object code is required to be optimized.

In some programming languages such as Fortran 90 and Fortran 95, values of or relationships between variables may be determined based on standardized rules or restrictions specified for the programming languages, although such rules or restrictions are specified in different manners depending on the programming languages. For example, in Fortran 90 or Fortran 95, scalar representations of arrays as illustrated in FIG. 8(A) can be rewritten in vector representations as illustrated in FIG. 8(B), while in C and FORTRAN 77, access to arrays can be described in only element by element. According to the rules and restrictions of Fortran 90 or Fortran 95, the value of the variable L in the description in the fourth line of the text illustrated in FIG. 8(B) can be determined to be 100.

Loop fusion is one of the well-known optimization techniques, and is a technique of decreasing the number of loops for reducing overheads which are required for loop control. That is, a plurality of loops satisfying a predetermined condition are combined into a single loop. For loop fusion, some sophisticated techniques are known for analyzing relationships between arrays.

Further, Japanese Unexamined Patent Publication, No. 9-62514 discloses a method for facilitating loop fusion processing which is performed for optimizing the program code. In the method, a technique for analyzing relationships between arrays is used. To be more specific, JPP 9-62514 discloses facilitation of loop fusion processing by using a function of analyzing subscripts of the arrays in a program code, which is described in a programming language allowing vector representations of arrays, such as Fortran 90 and Fortran 95. For example, FIG. 9 exhibits an example of a result of loop fusion, which is obtained by the subscript analysis of arrays in a program code. The subscript analysis is performed on the three assignment statements expressed by arrays, which are indicated in the upper rectangle in FIG. 9. The result of the subscript analysis is utilized for producing an optimum (fused) loop, as indicated in the lower rectangle in FIG. 9. According to the rules and restrictions specified for the above programming language such as Fortran 90 and Fortran 95, the sizes of the arrays on the right-hand side and the left-hand side of each assignment statement are identical. Therefore, the result of subscript analysis performed on the arrays in the three assignment statements in the upper rectangle in FIG. 9 shows that $L=5=M-1=N-2$. This result is used for facilitation of the loop fusion processing and production of a fused loop having an optimum form, as illustrated in FIG. 9. For example, the number of iterations in the fused DO loop is determined as $L=5$ by the above subscript analysis, in advance of the loop fusion processing.

As described above, conventionally, the result of subscript analysis of arrays is utilized for facilitating the loop fusion processing. However, the result of subscript analysis of arrays is not utilized in optimization processing other than the loop fusion processing.

SUMMARY OF THE INVENTION

An object of the present invention is to provide a method for facilitating various types of optimization in a compiler, based on rules or restrictions specified for a programming language of a program code.

Another object of the present invention is to provide a compiler in which provision is made for facilitating various types of optimization, based on rules or restrictions specified for a programming language of a program code.

A further object of the present invention is to provide an apparatus for facilitating optimization processing in a compiler, whereby various types of optimization can be facilitated based on rules or restrictions specified for a programming language of a program code.

(1) According to the first aspect of the present invention, there is provided a method of facilitating optimization processing in a compiler. The method comprises the steps of: (a) storing, in a language-specific-rule table, one or more predetermined rules which are specified for one or more programming languages; (b) analyzing a program code which includes one or more instructions, and is described in one of the one or more programming languages, based on the one or more predetermined rules, to obtain an analysis result; and (c) embedding the analysis result in the program code.

The method according to the first aspect of the present invention may also have one or any possible combination of the following additional features (i) to (v).

(i) In the step (a), the one or more predetermined rules may be stored in the language-specific-rule table as one or more language-specific-information analyzing functions, and the step (b) may comprise the substeps of (d) reading out, from the language-specific-rule table, at least one of the one or more language-specific-information analyzing functions which is needed for analyzing the program code, and (e) determining values of or relationships between variables included in the program code, based on the at least one of the one or more language-specific-information analyzing functions read out in the step (d), and producing the analysis result which includes the determined values of or relationships between the variables.

(ii) In addition to the feature (i), the step (b) may further comprise the substep of (f) the at least one of the one or more language-specific-information analyzing functions read out in the step (d) is registered in a check function table for use in the step (e).

(iii) In addition to the feature (ii), the operation in step (b) may be performed for each instruction set which is comprised of at least one of the one or more instructions, and in the step (c), the analysis result may be embedded in a position preceding the instruction set in the program code.

(iv) The program code may be a source code.

(v) The program code may be an intermediate code.

(2) According to the second aspect of the present invention, there is provided an apparatus for facilitating optimization processing in a compiler. The apparatus comprises a language-specific-rule table which stores one or more predetermined rules which are specified for one or more programming languages; an analyzing unit which analyzes a program code which includes one or more instructions, and is described in one of the one or more programming languages, based on the one or more predetermined rules, to obtain an analysis result; and an embedding unit which embeds the analysis result in the program code.

The apparatus according to the second aspect of the present invention may also have one or any possible combination of the following additional features (vi) to (x).

(vi) The language-specific-rule table may store the one or more predetermined rules as one or more language-specific-information analyzing functions, and the analyzing unit may comprise a readout unit which reads out, from the language-specific-rule table, at least one of the one or more language-specific-information analyzing functions which is needed for analyzing the program code, and a determination unit which determines values of or relationships, between variables included in the program code, based on the at least one of the one or more language-specific-information analyzing functions read out by the readout unit, and produces the analysis result which includes the determined values of or relationships between the variables.

(vii) In addition to the feature (vi), the analyzing unit may comprise a check function table in which the at least one of the one or more language-specific-information analyzing functions read out by the readout unit is registered for use by the determination unit.

(viii) In addition to the feature (vii), the operation of the analyzing unit may be performed for each instruction set which is comprised of at least one of the one or more instructions, and the embedding unit may embed the analysis result in a position preceding the instruction set in the program code.

(ix) The program code may be a source code.

(x) The program code may be an intermediate code.

(3) According to the third aspect of the present invention, there is provided a product for use with an apparatus for facilitating optimization processing in a compiler. When the product is used with the apparatus, the product is able to output control information which directs the apparatus to comprise: a language-specific-rule table which stores one or more predetermined rules which are specified for one or more programming languages; an analyzing unit which analyzes a program code which includes one or more instructions, and is described in one of the one or more programming languages, based on the one or more predetermined rules, to obtain an analysis result; and an embedding unit which embeds the analysis result in the program code.

The product according to the third aspect of the present invention may have one or any possible combination of the aforementioned additional features (vi) to (x).

(4) According to the fourth aspect of the present invention, there is provided a compiler comprising: a front end unit which performs syntax analysis of a source code which is described in one of one or more predetermined programming languages, to produce an intermediate code; a language-specific-rule table which stores one or more predetermined rules which are specified for the one or more predetermined programming languages; an analyzing unit which analyzes the intermediate code which includes one or more instructions, based on the one or more predetermined rules, to obtain an analysis result; an embedding unit which embeds the analysis result in the program code to produce a modified intermediate code; and an optimizing unit which performs an operation of optimizing the modified intermediate code.

The compiler according to the fourth aspect of the present invention may have one or any possible combination of the aforementioned additional features (vi) to (viii).

(5) According to the fifth aspect of the present invention, there is provided a compiler comprising: a language-specific-rule table which stores one or more predetermined rules which are specified for one or more programming languages; an analyzing unit which analyzes a source code which includes one or more instructions, and is described in one of the one or more programming languages, based on the one or more predetermined rules, to obtain an analysis result; an embedding unit which embeds the analysis result in the source code to produce a modified source code; a syntax analyzing unit which performs syntax analysis of the modified source code which is described in one of one or more predetermined programming languages, to produce an intermediate code; and an optimizing unit which performs an optimization operation on the intermediate code.

The compiler according to the fifth aspect of the present invention may have one or any possible combination of the aforementioned additional features (vi) to (viii).

(6) According to the first to fifth aspects of the present invention, the program code is analyzed based on rules or restrictions which are specified for the programming language of the program code so as to determine values of or relationships between variables included in the program code, and information on the obtained values of or relationships between variables is embedded in the program code. Therefore, the optimization function of the compiler can easily utilize the analysis result when the optimization function handle the program code. Thus, the optimization processing is facilitated by the provision of the present invention, and the type of the facilitated optimization processing is not limited to the loop fusion.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIGS. 2(A) and 2(B) are diagrams illustrating examples of contents of the language-specific-rule table 7;

FIG. 3 is a diagram illustrating an example of a source code;

FIG. 4 is a diagram illustrating a modified source code which is produced by embedding the analysis results, L=5 and N=6, in the source code of FIG. 3;

FIG. 5 is a diagram illustrating a result of optimization obtained by utilizing the analysis result, L=5, and completely unrolling the loops included in the source code of FIG. 3;

FIG. 6 is a diagram illustrating a further optimized program code obtained by enhancing the degree of parallelism in the program code of FIG. 5;

FIG. 8(A) is a diagram of an example of a program code including scalar representations of arrays;

FIG. 8(B) is a diagram of an example of a program code including vector representations of arrays; and FIG. 9 exhibits an example of a result of loop fusion, which is obtained by the subscript analysis of arrays in a program code.

DESCRIPTION OF THE PREFERRED EMBODIMENTS

Embodiments of the present invention are explained below with reference to drawings.

(1) Construction of Compiler

Figure 1:
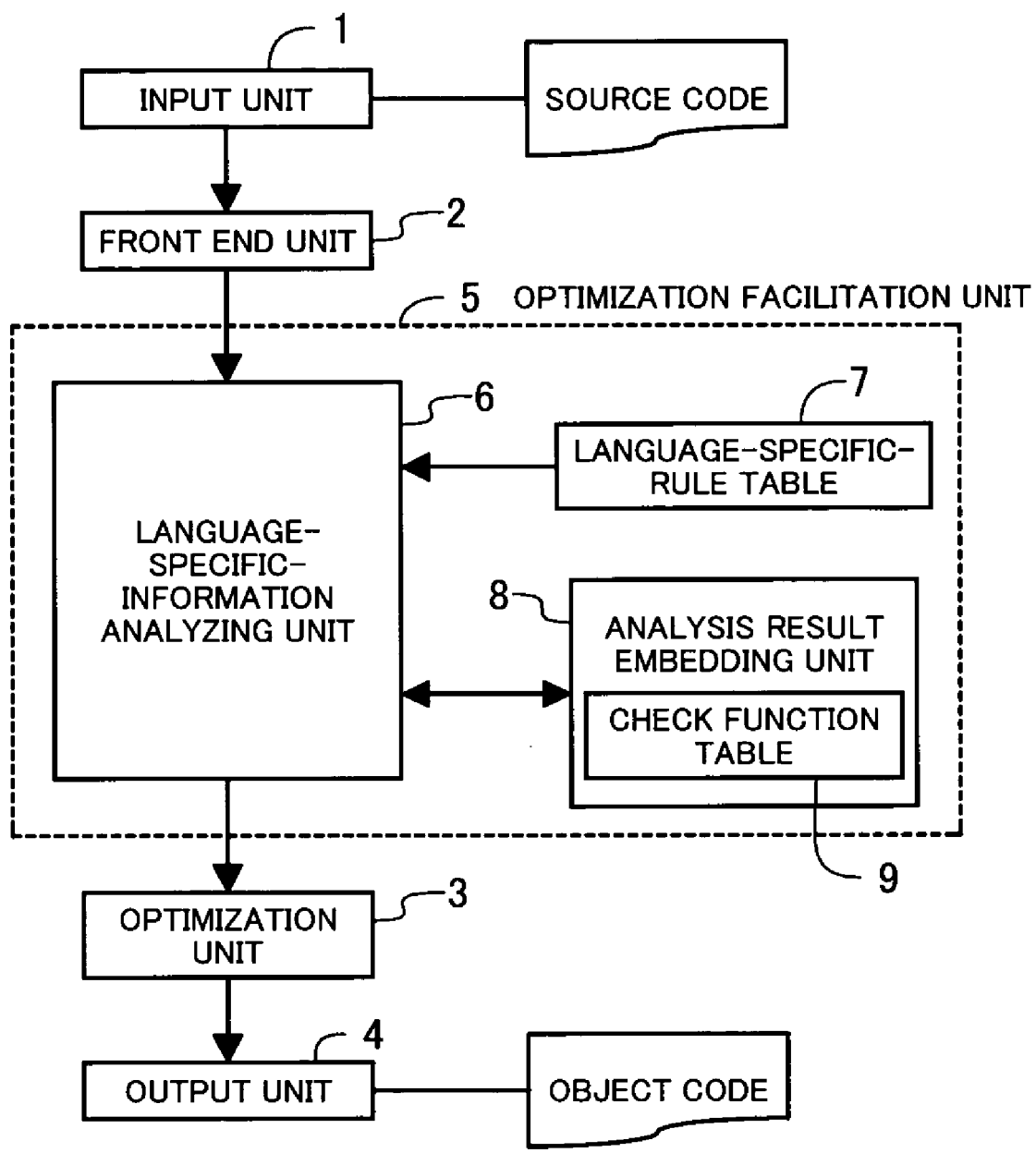
FIG. 1 is a diagram illustrating the construction of a compiler as an embodiment of the fourth aspect of the present invention.

FIG. 1 is a diagram illustrating the construction of a compiler as an embodiment of the fourth aspect of the present invention. The compiler of FIG. 1 comprises an input unit 1, a front end unit 2, an optimization unit 3, an output unit 4, and an optimization facilitation unit 5. The input unit 1 inputs a source program (code). The front end unit 2 performs syntax analysis and the like of the source code, and produces an intermediate code. The optimization unit 3 processes the intermediate code so as to optimize an object program (code). The output unit 4 produces the object code based on the intermediate code processed by the optimization unit 3.

The optimization facilitation unit 5 is an embodiment of the apparatus according to the second aspect of the present invention, and is provided between the front end unit 2 and the optimization unit 3 in the embodiment of FIG. 1. The optimization facilitation unit 5 analyzes the intermediate code based on the rules and restrictions specified for one of a plurality of programming languages, and modifies the intermediate code so as to facilitate the optimization processing which is performed by the optimization unit 3. The optimization facilitation unit 5 comprises a language-specific-information analyzing unit 6, a language-specific-rule table 7, an analysis result embedding unit 8, and a check function table 9. The language-specific-rule table 7 stores information on the rules and restrictions which are specified for a plurality of programming languages, in the form of one or more language-specific-information analyzing functions (hereinafter also called check functions).

When a source code is input into the input unit 1, the front end unit 2 performs syntax analysis and the like of the source code, and produces an intermediate code. In the optimization facilitation unit 5, the language-specific-information analyzing unit 6 first refers to the language-specific-rule table 7 to determine at least one of the one or more check functions which is used for analyzing language specific information in the intermediate code, and registers the determined check function in the check function table 9, which is provided in the analysis result embedding unit 8. Next, when the language-specific-information analyzing unit 6 receives each instruction in the intermediate code produced by the front end unit 2, the language-specific-information analyzing unit 6 determines whether or not values of or relationships between the variables in the instruction can be determined, and obtains the values of or relationships between the variables when they can be determined. Thus, an analysis result is obtained for each single instruction in the intermediate code, or for each set of a plurality of instructions in the intermediate code, when it is possible. Then, the analysis result embedding unit 8 embeds the obtained analysis result in a position preceding each instruction in the intermediate code, where the obtained analysis result is described in the form which can be recognized by the optimization unit 3. Thus, the intermediate code is modified by the analysis result embedding unit 8. The modified intermediate code is passed to the optimization unit 3. In the optimization unit 3, the intermediate code is processed so as to optimize an object code, which is then produced by the output unit 4 based on the optimized intermediate code produced by the optimization unit 3.

As described above, the analysis result is described in the form which can be recognized by the optimization unit 3, and embedded in the intermediate code, where the analysis result is obtained corresponding to each instruction in the intermediate code, and indicates the values of or relationships between the variables in the intermediate code. Therefore, for example, the optimization unit 3 can receive a constant as a value of a variable, instead of receiving as the variable. Thus, the optimization unit 3 can utilize the above analysis result for not only the loop fusion but also all the other types of optimization.

In the construction of FIG. 1, the optimization facilitation unit 5 is arranged between the front end unit 2 and the optimization unit 3, and the optimization facilitation unit 5 analyzes the intermediate code produced by the front end unit 2, and embeds the analysis result in the intermediate code. However, the optimization facilitation unit 5 may be provided in the front end unit 2 so that the optimization facilitation unit 5 analyzes the source code before the syntax analysis, and embeds the result of the analysis based on the rules and restrictions specified the programming language, in the source code. In this case, the compiler realizes the aforementioned fifth aspect of the present invention.

(2) Language-Specific-Rule Table

FIGS. 2(A) and 2(B) are diagrams illustrating examples of contents of the language-specific-rule table 7. The language-specific-rule table 7 in this embodiment includes a first and second tables, as shown in FIGS. 2(A) and 2(B), respectively. For example, the first table includes, as a language-specific-information analyzing function (check function), information indicating whether or not the respective programming languages allow vector representation of arrays, as illustrated in FIG. 2(A). The second table includes at least one other language-specific-information analyzing function (at least one other check function), and indicates whether or not a certain rule corresponding to each of the at least one other check function is specified for the respective programming languages. For example, the rule (check function) "No. 1" illustrated in FIG. 2(B) is that the sizes of arrays on the right-hand and left-hand sides of each assignment statement are identical.

(3) Examples

FIG. 3 is a diagram illustrating an example of a source code. When the source code of FIG. 3 is written in Fortran 90 or Fortran 95, and the language-specific-information analyzing unit 6 analyzes the assignment statement in the fourth line of the source code of FIG. 3, L=5 is obtained as an analysis result based on the above rule No. 1 in FIG. 2(B). Similarly, N=6 is obtained as an analysis result from the assignment statement in the fifth line of the source code of FIG. 3, based on the above rule No. 1. According to the present invention, the above analysis results, L=5 and N=6, are passed to the optimization unit 3 by embedding the analysis results in the source code or an intermediate code by the analysis result embedding unit 8, so as to facilitate optimization processing executed by the optimization unit 3.

FIG. 4 is a diagram illustrating a modified source code which is produced by embedding the above analysis results, L=5 and N=6, in the source code of FIG. 3. In the example of FIG. 4, the analysis result, L=5, is embedded in a position preceding the assignment statement which includes the variable L, and the other analysis result, N=6, is embedded in a position preceding the assignment statement which includes the variable N. However, in this example, only the former analysis result, L=5, facilitates the optimization processing by the optimization unit 3, as explained below.

FIG. 5 is a diagram illustrating a result of optimization obtained by utilizing the above analysis result, L=5, and completely unrolling the loops included in the source code of FIG. 3. In the program code of FIG. 5, the substantial loops represented by the assignment statements in the fourth and fifth lines, and the DO loop in the sixth to eighth lines of the source code of FIG. 3 are each unrolled completely in the program code of FIG. 5, and the above analysis result, L=5, is utilized when the DO loop is unrolled. That is, the loop unrolling optimization is facilitated by the analysis result, L=5, which is supplied to the optimization unit 3 by embedding the analysis result in a program code supplied to the optimization unit 3.

FIG. 6 is a diagram illustrating a further optimized program code obtained by enhancing the degree of parallelism in the program code of FIG. 5, where the degree of parallelism is enhanced by changing the order of the assignment statements of FIG. 5. Generally, instructions, e.g., assignment statements, included in a program code must be executed in the order in which the instructions are written in the program code. That is, each instruction (assignment statement) cannot be executed unless the preceding instruction (assignment statement) is executed. However, in the program code of FIG. 6, the assignment operation, k1=a(2)+a(3), is not affected by the result of the preceding assignment operation, k=k+a(1). Therefore, the assignment operation, k1=a(2)+a(3), can be executed without waiting for completion of the preceding assignment, k=k+a(1). Similarly, the assignment operation, k2=a(4)+a(5), can be executed without waiting for completion of the preceding assignment operations, k=k+a(1) and k1=a(2)+a(3). Thus, when a computer can perform a plurality of add operations in parallel, the above assignment operations, k=k+a(1), k1=a(2)+a(3), and k2=a(4)+a(5), can be concurrently executed, although an error may be produced in the case where the arrays A and the variable k are represented by floating point numbers.

As explained above, the embedment of the analysis result in the program code realizes constant propagation to the number of iterations in the DO loop, and thus facilitates the optimization processing.

Although the above explanations are provided based on the source (human-readable) programs as illustrated in FIGS. 3 to 6, the program code, which is analyzed, and in which the analysis result is embedded, may be a source code, an intermediate code, or a machine-executable code such as the object code.

(4) Operation Flow

Figure 7:
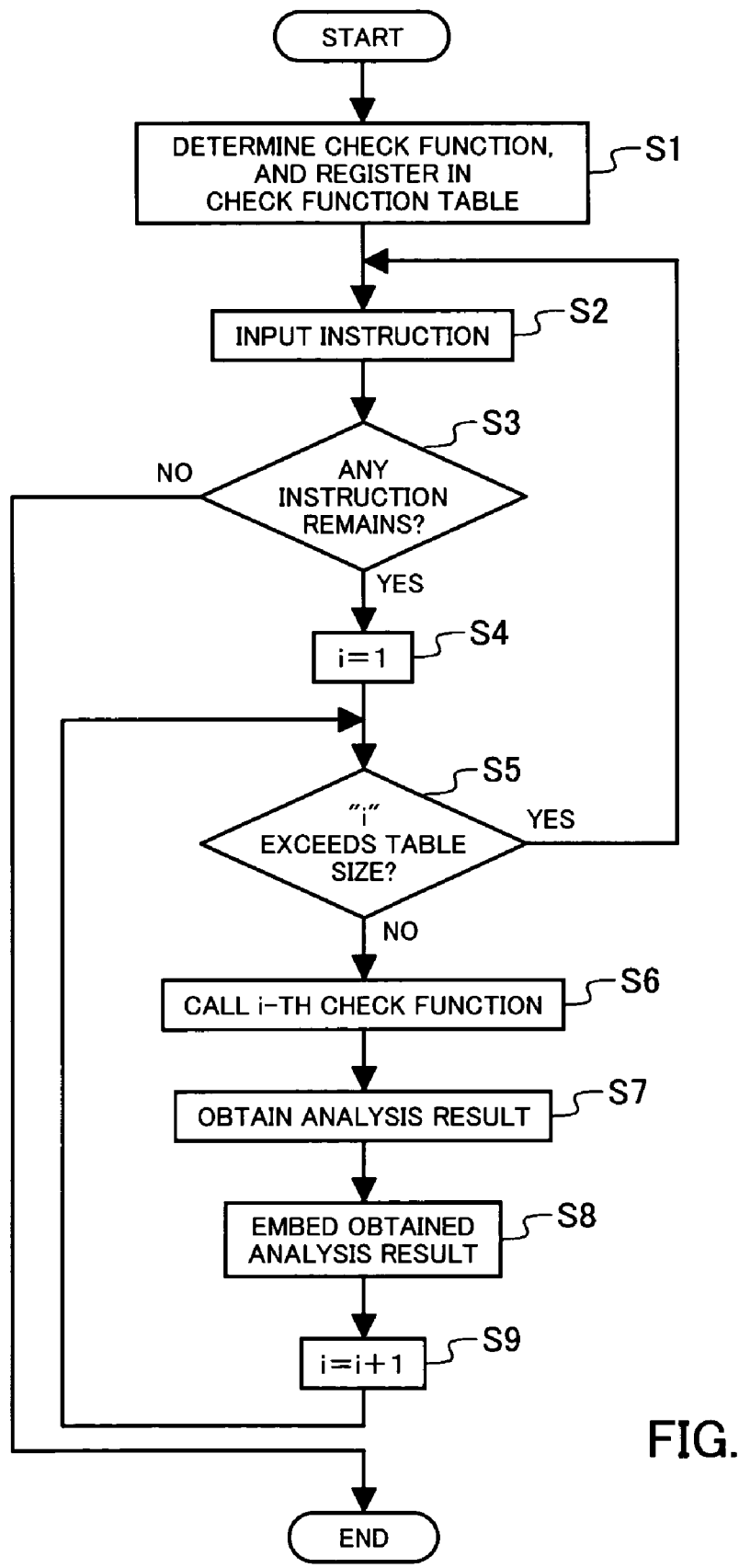
FIG. 7 is a flowchart of the operation of the optimization facilitation unit 5 in FIG. 1.

FIG. 7 is a flowchart of the operation of the optimization facilitation unit 5 in FIG. 1 which is an embodiment of the apparatus for facilitating optimization processing in a compiler, according to the second aspect of the present invention.

In step S1, the language-specific-information analyzing unit 6 refers to the language-specific-rule table 7, and determines at least one language-specific-information analyzing function (check function) which is used for analyzing language specific information in the intermediate code, and registers the determined check function in the check function table 9, which is provided in the analysis result embedding unit 8. For example, the language-specific-information analyzing unit 6 refers to the aforementioned first and second tables, determines the rules (check functions) Nos. 1 and 2 in the second table as the check functions to be used in the analysis of the intermediate code, and registers the determined check functions in the check function table 9.

In step S2, the language-specific-information analyzing unit 6 inputs an instruction from the intermediate code.

In step S3, it is determined whether or not any instruction remains in the intermediate code. When yes is determined, the operation goes to step S4. When no is determined, the operation of FIG. 7 is completed.

In step S4, the count "i" is set to its initial value, "1".

In step S5, it is determined whether or not the count "i" exceeds the size of the check function table 9. The size of the check function table 9 is the number of check functions registered in the check function table 9. For example, when only the rules (check functions) Nos. 1 and 2 are registered in the check function table 9, the above number is two. When yes is determined in step S5, the operation goes to step S2. When no is determined in step S5, the operation goes to step S6.

In step S6, the language-specific-information analyzing unit 6 calls the i-th check function from the check function table 9.

In step S7, the analysis result embedding unit 8 analyzes the instruction by using the called check function, to obtain an analysis result. For example, "L=5" and "N=6" are obtained as the analysis results by analyzing the instructions in the fourth and fifth lines of the source code of FIG. 3.

In step S8, the analysis result embedding unit 8 embeds the obtained analysis result in a position preceding the analyzed instruction in the program.

In step S9, the count "i" is incremented, and the operation goes to step S5.

As explained above, the analysis is performed by each of the check functions to obtain an analysis result, and the analysis result is embedded in the program. Thus, for example, the intermediate code as illustrated in FIG. 4 is obtained. Then, the program in which the analysis result is embedded is input into the optimization unit 3, and therefore the optimization as illustrated in FIGS. 5 and 6 can be performed.

(5) Other Matters (i) Instead of embedding the analysis result in a program code, all of the analysis results may be held in a table so that the optimization unit 3 can utilize the contents of the table. However, according to this method, bothersome analyzing operations are required for the optimization unit 3 to obtain information on values or effective ranges of variables. In addition, the optimization unit 3 must determine whether or not a value of a variable which is referred to in each instruction is available, by searching for the analysis result in the table, while the optimization unit 3 can immediately use the analysis result in the usual optimization processing when the analysis result is embedded in the program code to be optimized.

(ii) In addition, the operations and the functions of the present invention may be realized by using a certain product with an apparatus provided for facilitating the optimization processing in a compiler, e.g., by installing a computer-readable medium in a computer. The product is such that when the product is used with the apparatus (e.g., a computer), the product is able to output control information which directs the apparatus to realize any of the functions of the present invention. The product may be a semiconductor storage device storing a program which realizes the above functions, such as a ROM, or a magnetic storage medium such as a floppy disc or a hard disk, or a CD-ROM, a CD-R, a DVD-ROM, a DVD-RAM, a DVD-R, or the like. Further, the above product may be a programmed hardware logic circuit such as an LSI. The above product per se can be put into the market. Alternatively, program data realizing the above functions may be transferred through a communication network from a storage device included in a computer system to another computer system. When the program is executed in a computer system, for example, the program stored in a hard disk may be loaded in a main memory of the computer system.

(iii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iv) All of the contents of the Japanese patent application, No. 11-305026 are incorporated into this specification by reference.

What is claimed is:

1. A method of facilitating optimization processing in a compiler, comprising the steps of:
    (a) storing, in a language-specific-rule table, assignment rules which are specified for at least two programming languages allowing vector representation of each of said programming languages;
    (b) analyzing a program code which includes one or more instructions, and is described in a selected one of said programming languages, based on said assignment rules, to obtain an analysis result;
    (c) embedding said analysis result in said program code; and
    (d) optimizing said program code,
    wherein in said step (a), said assignment rules are stored in said language-specific-rule table as one or more language-specific-information analyzing functions, and
    said step (b) comprises the substeps of,
    (e) reading out, from said language-specific-rule table, at least one of said one or more language-specific-information analyzing functions which is needed for analyzing said program code, and
    (f) determining values of variables included in assignment statements extracted from said program code, based on said at least one of said one or more language-specific-information analyzing functions read out in said step (e), and producing said analysis result which includes the determined values of variables;
    wherein said step (b) further comprises the substep of,
    (g) said at least one of said one or more language-specific-information analyzing functions read out in said step (e) is registered in a check function table for use in said step (f).

2. A method according to claim 1, wherein the operation in step (b) is performed for each instruction set which is comprised of at least one of said one or more instructions, and
    in said step (c), said analysis result is embedded in a position preceding said each instruction set in said program code.

3. A method according to claim 1, wherein said program code is a source code.

4. A method according to claim 1, wherein said program code is an intermediate code.

5. An apparatus for facilitating optimization processing in a compiler, comprising:
    a language-specific-rule table which stores assignment rules which are specified for at least two programming languages allowing vector representation of each of said programming languages;
    an analyzing unit which analyzes a program code which includes one or more instructions, and is described in a selected one of said programming languages, based on said assignment rules, to obtain an analysis result;
    an embedding unit which embeds said analysis result in said program code; and
    an optimizing unit which performs on operation of optimizing said program code,
    wherein said language-specific-rule table stores said assignment rules as one or more language-specific-information analyzing functions, and
    said analyzing unit comprises,
    a readout unit which reads out, from said language-specific-rule table, at least one of said one or more language-specific-information analyzing functions which is needed for analyzing said program code, and
    a determination unit which determines values of variables included in assignment statements extracted from said program code, based on said at least one of said one or more language-specific-information analyzing functions read out by said readout unit, and produces said analysis result which includes the determined values of the variables;
    wherein said analyzing unit comprises,
    a check function table in which said at least one of said one or more language-specific-information analyzing functions read out by said readout unit is registered for use by said determination unit.

6. An apparatus according to claim 5, wherein the operation of said analyzing unit is performed for each instruction set which is comprised of at least one of said one or more instructions, and
    said embedding unit embeds said analysis result in a position preceding said each instruction set in said program code.

7. An apparatus according to claim 5, wherein said program code is a source code.

8. An apparatus according to claim 5, wherein said program code is an intermediate code.

9. A computer readable medium product for use with an apparatus for facilitating optimization processing in a compiler, said product, when used with said apparatus, is able to output control information which directs the apparatus to comprise:
    a language-specific-rule table which stores assignment rules which are specified for at least two programming languages allowing vector representation of each of said programming languages;

an analyzing unit which analyzes a program code which includes one or more instructions, and is described in a selected one of said programming languages, based on said assignment rules, to obtain an analysis result;

an embedding unit which embeds said analysis result in said program code; and an optimizing unit which performs on operation of optimizing said program code, wherein said language-specific-rule table stores said assignment rules as one or more language-specific-information analyzing functions, and said analyzing unit comprises, a readout unit which reads out, from said language-specific-rule table, at least one of said one or more language-specific-information analyzing functions which is needed for analyzing said program code, and a determination unit which determines values of variables included in assignment statements extracted from said program code, based on said at least one of said one or more language-specific-information analyzing functions read out by said readout unit, and produces said analysis result which includes the determined values of the variables.

10. A product according to claim 9, wherein said program code is a source code.

11. A product according to claim 9, wherein said program code is an intermediate code.

12. A compiler comprising:

a front end unit which performs syntax analysis of a source code which is described in one of at least two predetermined programming languages allowing vector representation of each of said predetermined programming languages, to produce an intermediate code;

a language-specific-rule table which stores assignment rules which are specified for said predetermined programming languages;

an analyzing unit which analyzes said intermediate code which includes one or more instructions and is described in a selected one of said predetermined programming languages, based on said one or more assignment rules, to obtain an analysis result;

an embedding unit which embeds said analysis result in said intermediate code to produce a modified intermediate code; and an optimizing unit which performs an operation of optimizing said modified intermediate code;

wherein said language-specific-rule table stores said assignment rules as one or more language-specific-information analyzing functions, and said analyzing unit comprises, a readout unit which reads out, from said language-specific-rule table, at least one of said one or more language-specific-information analyzing functions which is needed for analyzing said intermediate code, and a determination unit which determines values of variables included in assignment statements extracted from said intermediate code, based on said at least one of said one or more language-specific-information analyzing functions read out by said readout unit, and produces said analysis result which includes the determined values of the variables.

13. A compiler comprising:

a language-specific-rule table which stores assignment rules which are specified for at least two programming languages allowing vector representation of each of said programming languages;

an analyzing unit which analyzes a source code which includes one or more instructions, and is described in a selected one of said programming languages, based on said assignment rules, to obtain an analysis result;

an embedding unit which embeds said analysis result in said source code to produce a modified source code;

a syntax analyzing unit which performs syntax analysis of said modified source code which is described in one of said programming languages, to produce an intermediate code; and an optimizing unit which performs an optimization operation on said intermediate code;

wherein said language-specific-rule table stores said assignment rules as one or more language-specific-information analyzing functions, and said analyzing unit comprises, a readout unit which reads out, from said language-specific-rule table, at least one of said one or more language-specific information analyzing functions which is needed for analyzing said source code, and a determination unit which determines values of variables included in assignment statements extracted from said source code, based on said at least one of said one or more language-specific-information analyzing functions read out by said readout unit, and produces said analysis result which includes the determined values of the variables.

* * * * *